United States Patent
Molin et al.

(10) Patent No.: US 11,175,193 B2
(45) Date of Patent: Nov. 16, 2021

(54) DISTRIBUTED OPTICAL FIBRE SENSOR FOR SENSING STRESS STATE

(71) Applicants: THALES, Courbevoie (FR); CENTRE NATIONAL DE LA RECHERCHE SCIENTIFIQUE, Paris (FR); UNIVERSITE NICE SOPHIA-ANTIPOLIS, Nice (FR)

(72) Inventors: Stéphanie Molin, Draveil (FR); Martine Doisy, Grasse (FR); Arnaud Peigne, Mougins (FR); Stefania Residori, Juan les Pins (FR); Umberto Bortolozzo, Juan les Pins (FR); Jean-Pierre Huignard, Paris (FR); Renaud Bouffaron, Antibes (FR); Daniel Dolfi, Orsay (FR)

(73) Assignees: THALES, Courbevoie (FR); CENTRE NATIONAL DE LA RECHERCHE SCIENTIFIQUE, Paris (FR); UNIVERSITE NICE SOPHIA-ANTIPOLIS, Nice (FR)

( * ) Notice: Subject to any disclaimer, the term of this patent is extended or adjusted under 35 U.S.C. 154(b) by 67 days.

(21) Appl. No.: 15/560,474

(22) PCT Filed: Mar. 17, 2016

(86) PCT No.: PCT/EP2016/055866
§ 371 (c)(1),
(2) Date: Sep. 21, 2017

(87) PCT Pub. No.: WO2016/150824
PCT Pub. Date: Sep. 29, 2016

(65) Prior Publication Data
US 2018/0058956 A1    Mar. 1, 2018

(30) Foreign Application Priority Data
Mar. 23, 2015    (FR) ...................................... 1500563

(51) Int. Cl.
  *G01L 1/24* (2006.01)
  *G01H 9/00* (2006.01)
  *G01D 5/353* (2006.01)

(52) U.S. Cl.
  CPC .............. *G01L 1/242* (2013.01); *G01D 5/353* (2013.01); *G01D 5/35306* (2013.01); *G01H 9/004* (2013.01)

(58) Field of Classification Search
  CPC .... G01L 1/242; G01D 5/353; G01D 5/35306; G01H 9/004
  See application file for complete search history.

(56) References Cited

U.S. PATENT DOCUMENTS

| 4,536,861 A | 8/1985 | Graindorge et al. |
| 4,708,471 A * | 11/1987 | Beckmann ......... G01M 11/3172 356/73.1 |

(Continued)

FOREIGN PATENT DOCUMENTS

| EP | 0 021 945 A1 | 1/1981 |
| EP | 1 043 632 A1 | 10/2000 |

OTHER PUBLICATIONS

R. Bouffaron et al., "All-optical acoustic array for underwater surveillance," Proceedings of SPIE, vol. 8794, May 20, 2013, pp. 8794ON, XP055133779.

(Continued)

Primary Examiner — Georgia Y Epps
Assistant Examiner — Don J Williams
(74) Attorney, Agent, or Firm — BakerHostetler (57) ABSTRACT

A distributed optical fiber sensor of dynamic stress state comprises: an optical assembly configured to generate a series of optical pulses; an optical fiber of optical length L; an optical system configured to: inject through the first end at least the series of optical pulses; receive at the level of the (Continued)

end at least one series of output optical pulses, arising from the input pulses after propagation and retro-propagation in the fiber; generate at least one continuous reference beam or reference optical pulses on the basis of the optical assembly or of output optical pulses; produce a series of interference zones corresponding to the interference between the reference beam or a reference pulse and a signal optical pulse arising from an output optical pulse; a holographic detector comprising: a liquid-crystal light valve, the valve disposed so that it at least partially covers the interference zones, and producing holograms on the basis of the interference zones; at least one optical detector configured to detect output optical signals diffracted by the holograms.

10 Claims, 5 Drawing Sheets

(56) References Cited

U.S. PATENT DOCUMENTS

| | | | | |
|---|---|---|---|---|
| 5,592,313 | A | * | 1/1997 | Hart .................. G02B 5/203 359/24 |
| 7,668,411 | B2 | | 2/2010 | Davies et al. |
| 2011/0320147 | A1 | | 12/2011 | Brady et al. |
| 2012/0050459 | A1 | * | 3/2012 | Yoon .................. G02B 27/4205 348/40 |
| 2014/0163889 | A1 | * | 6/2014 | Finfer .................. E21B 47/101 702/12 |

OTHER PUBLICATIONS

U. Bortolozzo et al., "Beam coupling in photorefractive liquid crystal light valves; photorefractive liquid crystal light valves," Journal of Physics, vol. 41, No. 22, Nov. 21, 2008, pp. 224007, XP020141029.

Farries et al., Townsend, J.E. "Distributed Temperature Sensor Using Holmium-Doped Optical Fiber," Proceedings of OFC, Reno, NV, Jan. 1987.

Z. Qin et al., "Wavelet denoising method for improving detection performance of distributed vibration sensor," IEEE Photonics Technology Letters, Apr. 2012, vol. 24, No. 7, pp. 542-544.

U. Bortolozzo et al., "Sagnac interferometer with adaptive nonlinear detection," Optics Letters, vol. 36, No. 4, Feb. 15, 2011, pp. 520-522.

T. Horiguchi et al., "Development of a distributed sensing Technique using Brillouin scattering," Journal of Lightwave Technology, Jul. 1995, vol. 13, No. 7, pp. 1296-1302.

T. Horiguchi et al., "A technique to measure distributed strain in optical fibers," IEEE Photonics Technology Letters, May 1990, vol. 2, No. 5, pp. 352-354.

M. Nikles et al., "Simple distributed fiber sensor based on Brillouin gain spectrum analysis," Optics Letters, vol. 21, No. 10, May 15, 1996, pp. 758-760.

K. Hotate et al., "Measurement of Brillouin gain spectrum distribution along an optical fiber with a high spatial resolution using a correlation-based technique-Proposal, experiment and simulation," IEICE Trans. Electron., vol. E83-C, No. 3, Mar. 2000, pp. 405-411.

A. Kamshilin et al., "Adaptive interferometry with photorefractive crystal," Journal of Applied Physics, vol. 105, 2009, No. 031101.

Salvatore Di Girolamo et al., "Sensing of multimode-fiber strain by a dynamic photorefractive hologram," Optics Letters, vol. 32, No. 13, Jul. 2007, pp. 1821-1823.

U. Bortolozzo et al., "Picometer detection by adaptive holographic interferometry in a liquid-crystal light valve," Optics Letters, vol. 34, No. 13, Jul. 1, 2009, pp. 2006-2008.

* cited by examiner

DISTRIBUTED OPTICAL FIBRE SENSOR FOR SENSING STRESS STATE

CROSS-REFERENCE TO RELATED APPLICATIONS

This application is a National Stage of International patent application PCT/EP2016/055866, filed on Mar. 17, 2016, which claims priority to foreign French patent application No. FR 1500563, filed on Mar. 23, 2015, the disclosures of which are incorporated by reference in their entirety.

FIELD OF THE INVENTION

The field of the invention is that of optical fiber sensors. More precisely, it relates to sensors able to detect a disturbance in proximity to the fiber, making it possible to locate this disturbance along the fiber in a noisy environment.

BACKGROUND

Optical fiber sensors offer considerable advantages in respect of acoustic detection and temperature measurement. They allow long-distance interrogation (with or without offset) and can attain very great sensitivities (dispersed sensors) as well as a high spatial resolution (distributed sensors).

Underwater acoustic detection exhibits a major strategic interest for military applications (coastal surveillance, detection/identification of submarines and surface vessels) and civil applications (underwater biology, monitoring of offshore structures, seismic studies).

Dispersed optical fiber sensor arrays are particularly suitable for these requirements. They are based on one or more optical fibers comprising several sensitive zones a few centimeters in length and spaced apart, which constitute a spatial array of sensors. These sensors can be multiplexed in wavelength and/or in time. The most sensitive are based on active (DFB lasers) or passive Bragg gratings, coupled to a mechanical transducer making it possible to transform the deformation due to the pressure wave into an amplified and controlled longitudinal elongation of the optical fiber.

These make it possible to attain sensitivities of below a picostrain i.e. capable of detecting relative variations of the fiber length of $\Delta L/L$ of the order of $10^{-12}$.

In recent years, the monitoring of works (buildings, bridges, oil pipelines and gas pipelines, etc.) has bred new requirements, in particular that of very long distance interrogation (>50 km) with spatial resolutions of a few meters to a few centimeters. To this end, distributed optical fiber sensors offer big advantages. They refer to the set of optical fiber sensors for which the sensitive part is composed of the entire single-mode or multimode optical fiber. A spatial array of "virtual sensors" along the fiber can be reconstructed by processing the optical signal. The spacing of this array is determined by the characteristics of the signal processing and therefore presents the advantage of being able to be tailored electronically. The length of the stretch of fiber over which the measurement is averaged for each "virtual" sensor depends on the spatial resolution associated with the optical processing of the signal which carries the disturbance induced by the quantity to be measured. Distributed sensors are based on the processes of elastic and inelastic scattering in optical fibers. The most widespread systems use the principle of optical time domain reflectometry (OTDR). The first systems consisted in analyzing the Rayleigh backscattering of a wide-band optical source as described in the article by Farries, M. C.; Fermann, M. E.; Poole, S. B.; Townsend, J. E. "*Distributed Temperature Sensor Using Holmium 3+ Doped Fiber*". In *Proceedings of OFC*, Reno, Nev., USA, 19 Jan. 1987.

Other approaches based on the same principle have emerged in recent years. Among them may be noted the principle of phase-sensitive optical reflectometry (phase-OTDR) as described in the article by Qin, Z.; Chen L.; Bao, X. "*Wavelet denoising method for improving detection performance of distributed vibration sensor*". IEEE Photonics Technol. Lett. 2012, 24, 542-544, as well as a heterodyne pulsed scheme described in the article by M. D. Mermelstein, A. Tveten, C. K. Kirkendall, and A. Dandridge, "*Double-Pulse Heterodyne Rayleigh Backscattering in an Acoustically Driven Single-Mode Optical Fiber*," NRL-FR-9932, 1999.

Moreover, architectures using the principle of Brillouin scattering have been much studied. In this case, the shift of the Brillouin frequency, sensitive to the longitudinal elongation of the optical fiber (0.056 MHz/µ-strain) as well as to temperature (1.26 MHz/° C.), is what is measured. The simplest configuration uses the principle of spontaneous Brillouin scattering (B-OTDR) as described in the article by Horiguchi T, Shimizu K, Kurashima T, Tateda M, Koyamada Y., "*Development of a distributed sensing Technique using Brillouin scattering*" Journal of Lightwave Technology, 1995, 13(7): 1296-1302. It consists in injecting a pump pulse into an optical fiber. Frequency shift, measured with the aid of heterodyne detection, of the backscattered Stokes wave allows conversion into an elongation or temperature, and measurement of the flight time allows location.

Other approaches use the principle of stimulated Brillouin scattering (B-OTDA), as described in the articles by Horiguchi T, Kurashima T, Tateda M., "*A technique to measure distributed strain in optical fibers*" IEEE Photonics Technology Letters, 1990, 2(5): 352-354, or by Nikles M, Thevenaz L, Robert P A. "*Simple distributed fiber sensor based on Brillouin gain spectrum analysis*". Optics Letters, 1996, 21 (10): 758-760. They then require the use of two counter-propagating optical waves, pump and probe. In certain phase-tuning conditions, their interaction generates an acoustic grating which diffracts the photons of the pump wave toward the probe wave.

All of these temporal approaches can be transposed to the frequency domain. In this case, one speaks of optical frequency domain reflectometry (OFDR). Latterly, an original scheme has been proposed by Hotate et. al. consisting in modulating the two signals, pump and probe, so as to generate amplification windows whose position and width are controllable via the modulation parameters, as described in the article by Hotate, K.; Hasegawa, T. "*Measurement of Brillouin gain spectrum distribution along an optical fiber with a high spatial resolution using a correlation-based technique-Proposal, experiment and simulation*," IEICE Trans. Electron. 2000, E83-C, 405-411.

Davies et al. propose an architecture of the OTDR type based on the use of a multimode optical fiber associated with a spatial filter making it possible to select the fundamental mode $LP_{01}$ of the optical fiber as described in the patent "*Distributed vibration sensing system using multimode fiber*," U.S. Pat. No. 7,668,411 B2 (2010), but without exploiting the phase information contained in the higher order modes.

In parallel, dynamic holography has been particularly studied in photo-refractive crystals and described in particular in the article by Kamshilin, A. A., Romashko, R. V. and Kulchin, Y. N., "*Adaptive interferometry with photorefrac-* tive crystal," J. Appl. Phys. 105, 031101 (2009). An experimental demonstration of phase shift measurement using a multimode optical fiber and a cadmium telluride (CdTe) crystal has been proposed in the article by Salvatore Di Girolamo, Alexei A. Kamshilin, Roman V. Romashko, Yuriy N. Kulchin, and Jean C. Launay, "*Sensing of multimode-fiber strain by a dynamic photorefractive hologram*," Opt. Lett. 32, 1821-1823 (2007), however, without effective filtering of slow disturbances since no use is made of a liquid-crystal light valve as non-linear medium which can guarantee re-phasing and insensitivity to slow disturbances of the environment with luminous intensities of three orders of magnitude lower.

Generally, a liquid-crystal light valve consists of a fine nematic liquid crystal layer contained between a photoconductor substrate and a glass window, on which two transparent electrodes are deposited. Liquid crystals are anisotropic organic molecules characterized by their large birefringence. In their nematic phase, they are on average oriented along a preferential direction. Under the action of an electric field (applied between the two electrodes), the molecules reorient themselves and induce a change in the extraordinary optical index. The modification of the material's conductivity (proportional to the optical intensity) induces a voltage drop at the interface between the photoconductor and the liquid crystal, leading to the reorientation of its constituent molecules. This results in a modification of the birefringence and consequently an optical phase shift. The light valve can therefore be considered to be an optical Kerr effect medium. This component has been studied mainly for the purposes of optical limiter for high-power lasers and described in particular in the article by Salvatore Di Girolamo, Alexei A. Kamshilin, Roman V. Romashko, Yuriy N. Kulchin, and Jean C. Launay, "*Sensing of multimode-fiber strain by a dynamic photorefractive hologram*," Opt. Lett. 32, 1821-1823 (2007).

Adaptive holography in a liquid-crystal light valve involves the principle of two-wave mixing. This process dispenses with the phase piston (uniform phase shift of the wavefront, term commonly used) of the interferometer. Consequently, detection is linear without needing to add a feedback loop. A first experimental demonstration, based on this principle, has made it possible to demonstrate an interferometer whose output intensity is very sensitive to the phase difference between the arms, as described in the article by Bortolozzo, U., Residori, S. and Huignard, J. P., "*Picometer detection by adaptive holographic interferometry in a liquid-crystal light valve*," Opt. Lett. 34, 2006-2008 (2009).

This same principle has allowed the production of an ultra-sensitive accelerometer based on the Sagnac effect and described in the article by Bortolozzo, U., Rubin, J., Residori, S. and Huignard, J. P., "*Sagnac interferometer with adaptive nonlinear detection*," Opt. Lett. 36, 520 (2011).

SUMMARY OF THE INVENTION

In this context, the subject of the present invention is a distributed sensor integrating an optical fiber, preferably multimode, and an adaptive interferometer comprising a liquid-crystal valve as recombination medium, allowing the detection of low dynamic stresses in a noisy environment, whereas, currently, slow disturbances of the environment impose stresses on the sensor architectures used, and optical fiber-based distributed detection is generally incompatible with high sensitivity.

The sensor of the present invention uses an optical fiber as sensitive part associated with detection by adaptive holography in a light valve (making it possible to filter the low frequencies, corresponding to the noise due to the environment) and integrating a distributed-sensor-compatible interrogation architecture.

More precisely, the subject of the present invention is a distributed optical fiber sensor of dynamic stress state, said sensor comprising:
  an optical assembly comprising at least one laser emitting at a wavelength $\lambda$, said optical assembly being configured to generate a series of optical pulses $I_{pi}$;
  an optical fiber exhibiting a first end and a second end and of optical length L;
  an optical system configured to:
    inject through said first end at least said series of optical pulses $I_{pi}$;
    receive at the level of said first end at least one series of output optical pulses, an output optical pulse $I_{psi}$ being a carrier of the intensity of reflection of said ends of the fiber and of the backscattered intensity along said fiber;
    generate at least one continuous reference beam $F_r$ or reference optical pulses $I_{pri}$ on the basis of said optical assembly or of said output optical pulses $I_{psi}$;
    produce a series of interference zones corresponding to the interference between said reference beam $F_r$ or a reference pulse $I_{pri}$ and a signal optical pulse $I_{psiS}$ arising from an output optical pulse $I_{psi}$;
  a holographic detector comprising:
    a LCLV liquid-crystal light valve comprising a liquid crystal layer disposed between two substrates, one of the substrates comprising a photoconductor material for said emission wavelength $\lambda$, said LCLV valve being disposed so that it at least partially covers said interference zones, said valve being configured to produce holograms on the basis of said interference zones;
    at least one optical detector configured to detect output optical signals diffracted by said holograms.

According to variants of the invention, the optical assembly comprising at least one laser emitting at a wavelength $\lambda$, comprises first means which may be a first acousto-optical modulator, for generating optical pulses.

According to variants of the invention, the sensor comprises at least:
  a circulator positioned:
    at the output of said optical assembly comprising at least one laser emitting at a wavelength $\lambda$;
    at the input of said optical fiber;
    at the input of said LCLV liquid-crystal light valve;
  a coupler situated at the output of said fiber so as to create two optical pathways carrying output optical pulses;
  means for delaying said fiber output pulses on one of said two pathways so as to create a signal pathway carrying signal optical pulses and a reference pathway carrying reference optical pulses so as to generate said interference zones on said light valve.

According to variants of the invention, the sensor furthermore comprises second means which may be a second acousto-optical modulator, situated at the output of the circulator and at the input of the coupler making it possible to select gates of duration $2\Delta L/c$ with c the speed of light in vacuo and $\Delta L/2$ the length of a sensitive zone defined between a position $A_i$ and a position $B_i$ at the level of said fiber and referenced from said first end, so as to allow only backscattered waves originating from a sensitive zone of said fiber at one and the same time to interfere;

the means for delaying said output pulses introducing an additional length to be traversed $\Delta L$;

the pulses are separated by a duration $t_R$, such that $t_R > 2L/c$ the duration of said pulses $t_p$ being such that $t_p > \Delta L/c$ and $t_R < t_{off}$ with $t_{off}$, the response time of the liquid crystals.

According to variants of the invention, the sensor furthermore comprises:

second means which may be a second acousto-optical modulator, situated at the output of said light valve and placed at the input of said optical detector, making it possible to select gates of duration: $t_R - (t_p + \Delta L/c)$;

the means for delaying said pulses introducing an additional length to be traversed of $\Delta L$ with $\Delta L/2$ the length of a sensitive zone defined between a position $A_i$ and a position $B_i$ at the level of said fiber and referenced from said first end;

the pulses are separated by a duration $t_R$, such that $t_R > 2L/c$ the duration of said pulses $t_p$ being such that $t_p > \Delta L/c$ and $t_R < t_{off}$ with $t_{off}$, the response time of the liquid crystals;

said gates making it possible to filter the intensities of reflection of said ends of the fiber and to preserve a part of the backscattered intensity along said fiber;

a digital processing unit situated at the optical detector output to analyze the various probed active zones.

The signal acquired on the photodiode is converted into an electrical signal. A sampling of this signal is performed making it possible to analyze the information included in a sample (time window) and corresponding to the phase signal experienced by the fiber at the corresponding distance z, referenced with respect to an end of the fiber.

According to variants of the invention, the sensor furthermore comprises:

a so-called writing laser assembly comprising at least one laser emitting a series of so-called writing pulses at a pump frequency $\omega_p$ and a laser beam emitting a series of so-called writing pulses at a signal frequency $\omega_s$ different from the frequency $\omega_p$;

the optical system being configured:

to inject through said first end said series of writing pulses at the frequencies $\omega p$ and $\omega s$, inscribing at least one Brillouin grating element in said optical fiber;

to inject said series of pulses arising from said optical assembly comprising at least one laser emitting at a wavelength $\lambda_s$ corresponding to a reading laser beam at said signal frequency $\omega_s$;

the position $Z_r$ of the writing of said Brillouin grating element being referenced with respect to the second end of said fiber and being adjusted through the temporal shift between two writing pulses at the frequencies $\omega_p$ and $\omega_s$.

According to variants of the invention, the writing laser assembly comprises:

said laser emitting a laser beam;

means for dividing said beam into two pathways;

means for shifting the pump frequency $\omega_p$ toward a signal frequency $\omega_s$ on one of the pathways;

means for generating pulses on the two frequency-shifted optical pathways which may be of acousto-optical modulators type.

According to variants of the invention, said optical system is configured such that said reference beam $F_r$ or said reference pulses $I_{pri}$ interferes or interfere at the input of said liquid-crystal light valve without it or them having been injected into said optical fiber with said signal optical pulses $I_{psiS}$, arising from said optical pulses injected then propagated in said fiber.

According to variants of the invention, said optical system is configured such that said reference beam $F_r$ or said reference pulses $I_{pri}$ interferes or interfere at the input of said liquid-crystal light valve, it or they having been injected into said optical fiber with said signal optical pulses $I_{psiS}$, arising from said optical pulses injected then propagated in said fiber.

According to variants of the invention, the second end of the fiber comprises a reflecting treatment.

According to variants of the invention, said fiber is single-mode.

According to variants of the invention, said fiber is multimode.

According to variants of the invention, the emission wavelength of the optical assembly is equal to 1.5 µm.

BRIEF DESCRIPTION OF THE DRAWINGS

The invention will be better understood and other advantages will become apparent on reading the nonlimiting description which follows and by virtue of the appended figures among which.

DETAILED DESCRIPTION

The distributed optical fiber (fiber which is uniform over its entire length) sensor of the present invention makes it possible to exploit the principle of phase demodulation with a distributed measurement and exhibits the following main advantages by reason of the adaptive interferometer that it integrates and which are in particular:

insensitivity to slow phase variations of the waves which interfere (therefore low-frequency noise filtering);

the capacity to demodulate a complex wavefront (for example arising from a speckle originating from a multimode fiber, thereby making it possible to use a multimode fiber as sensor, which, with respect to a single-mode fiber, and for the same sensitive zone length, gives a sensitivity gain related to the numbers of modes excited).

The sensor of the present invention comprises at least one coherent optical source, and means for generating two optical waves: a reference wave $E_R$ at the frequency $\omega_R$ and a signal wave $E_s$ at the frequency $\omega_s$, which is injected into the optical fiber and analyzed at the fiber output after propagation and retro-propagation in said fiber.

Figure 1:
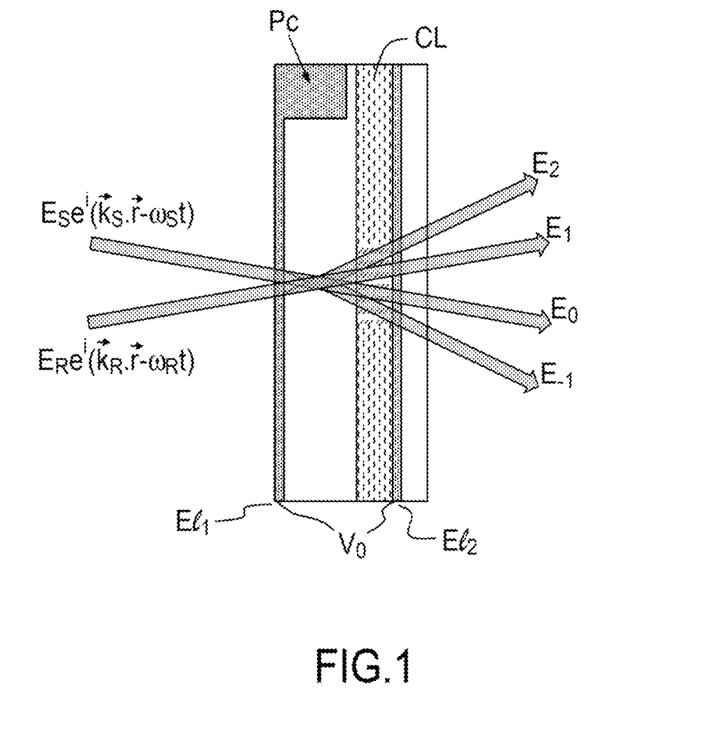
FIG. 1 illustrates the recombining of the reference and signal signals on a liquid-crystal light valve thus forming an intensity array, in a distributed fiber sensor of the invention.

Each mode of the signal wave experiences the phase disturbances integrated along the optical fiber. The reference wave and the signal wave are recombined on a liquid-crystal light valve thus forming an intensity array as illustrated in FIG. 1, which depicts the photoconductor PC and the liquid-crystal cell CL, a voltage $V_0$ being applied between two electrodes $El_1$ and $El_2$.

The light valve behaving as an optical Kerr effect medium, the intensity array is transferred to a phase hologram, the duration of recording being the response time of the liquid crystal. Consequently, the hologram accommodates all phase disturbances that are slow relative to its recording time, being re-inscribed continuously as a function of the slow modifications of the interference pattern. The liquid crystals have a response time of the order of a some hundred milliseconds for thicknesses of the order of some ten micrometers. Having regard to these characteristic dimensions, the diffraction takes place in a Raman-Nath regime. It follows from this that the reference and signal waves will diffract on the phase hologram, inducing several diffracted orders $E_1$, $E_2$, $E_{-1}$.

To illustrate this phenomenon, the Applicants have considered the order diffracted in the direction of the reference wave. The resulting wave after the light valve consists of the transmitted part of the reference wave and of the diffracted part of the signal wave. These two waves have the same wavefront for the phase variations whose characteristic time is greater than the response time of the liquid crystals. The beating of these two optical signals on a photodiode (which converts the phase modulations into intensity modulation) therefore allows the demodulation of the phase disturbance while circumventing the slow disturbances. Moreover, the multimode character makes it possible to effect an average over the whole set of propagation modes and to increase, ultimately, the signal-to-noise ratio. The analytical calculation presented hereinbelow makes it possible to demonstrate this principle.

The Applicants have undertaken the analytical calculation of the gain in sensitivity and have evaluated the power diffracted in the direction of the reference.

To do this, they have studied the phenomenon of self-diffraction in a liquid-crystal light valve (LCLV) between a reference wave $E_R$ and a wave arising from a multimode optical fiber $E_S$. The signal wave $E_S$ decomposes into the sum of the modes guided by the optical fiber. These are all phase-modulated and the Applicants have more particularly concerned themselves with the phase-amplitude conversion. The results presented hereinafter make the assumption that the modes are mutually orthogonal and that they are all polarized along the director axis of the liquid crystals.

The reference wave may be written:

$$E_R = A_R e^{j\vec{k}_R \cdot \vec{r}} + c.c. \quad (1.1)$$

With c.c: complex conjugate corresponding to the same term as the first term in the sum by replacing j by −j The signal wave may be written:

$$E_S = \sum_{m=1}^{M} E_m + c.c. = \sum_{m=1}^{M} A_m e^{j(\vec{\beta}_m \cdot \vec{r} + \phi_m + \Delta\phi_m \sin(\Omega t))} + c.c. \quad (1.2)$$

Where M is the number of mode, m is the index of the mode considered, $\Phi_m$ is a relative phase shift between the modes and $\Delta\Phi_m$ is the amplitude of the phase modulation at the frequency $\Omega$.

Under steady conditions, the refractive index in the valve is sensitive only to slow variations relative to its response time τ. The latter takes the form:

$$n = n_0 + n_2 I_{LF} \quad (1.3)$$

where $I_{LF}$ is the low-frequency contribution of the intensity array between $E_R$ and $E_S$:

$$I_{LF} = |E_R + E_S|_{LF}^2 \quad (1.4)$$

Consequently, it is necessary to determine the LF contribution of the signal wave. The Jacobi-Anger identity is accordingly used. The expression for the optical field for each mode m may be written:

$$E_m = A_m e^{j(\vec{\beta}_m \cdot \vec{r} + \phi_m)} \left[ J_0(\Delta\phi_m) + \sum_{\substack{k \neq 0}}^{K} J_k(\Delta\phi_m) e^{jk\Omega t} \right] \quad (1.5)$$

where the functions $J_k(x)$ are the Bessel functions of the $1^{st}$ kind of order k.

In conclusion, by feeding equation (3.5) into equation (3.4), it is possible to show that the low-frequency intensity of the intensity array becomes:

$$I_{LF} = |E_R|^2 + \sum_{m=1}^{M} |E_m|^2 + 2\sum_{m=1}^{M} A_m A_R J_0(\Delta\phi_m) \cos\left((\vec{\beta}_m - \vec{k}_R) \cdot \vec{r} + \phi_m\right) \quad (1.6)$$

Having regard to the characteristic dimensions of the LCLV liquid-crystal valve, the diffraction operates in the Raman-Nath regime. The optical field at output may then be written as the product of the incident optical field with the transmission coefficient of the valve:

$$E_{out} = T E_{in} = e^{jnk_0 d} E_{in} \quad (1.7)$$

with:

$$E_{in} = E_S + E_R \quad (1.8)$$

By putting:

$$\begin{cases} \gamma = k_0 d \left[ n_0 + n_2 |E_R|^2 + n_2 \sum_{m=1}^{M} |E_m|^2 \right] \\ \mathcal{X}_m = 2 k_0 d n_2 J_0(\Delta\phi_m) A_m A_R \end{cases} \quad (1.9)$$

The transmission coefficient can then be cast into the form:

$$T = e^{j\gamma} \prod_{m=1}^{M} e^{j\mathcal{X}_m \cos\left((\vec{\beta}_m - \vec{k}_R) \cdot \vec{r} + \phi_m\right)} \quad (1.10)$$

By using the Jacobi-Anger identity, it is possible to express the field diffracted in the direction of the reference wave in the form:

$$E_d = \quad (1.11)$$

$$\left\{ A_R \prod_{m=1}^{M} J_0(\mathcal{X}_m) + i \sum_{m=1}^{M} J_1(\mathcal{X}_m) \left[ \prod_{\substack{k=1 \\ k \neq m}}^{K} J_0(\mathcal{X}_k) \right] e^{j\Delta\phi_m \sin(\Omega t)} \right\} e^{j(\vec{k}_R \cdot \vec{r} + \gamma)}$$

In order to establish a first trend in the behavior of such a device, it is possible to make the reasonable assumption that $|X_m| \ll 1$.

This implies that $$J_0(X_m) \approx 1 \text{ and } J_1(X_m) \approx \frac{X_m}{2}.$$

Equation (1.11) then reduces to:

$$E_d = \left\{ A_R + i \sum_{m=1}^{M} \frac{X_m}{2} e^{j\Delta\phi_m \sin(\Omega t)} \right\} e^{j(\vec{k}_R \cdot \vec{r} + \gamma)} \quad (1.12)$$

The intensity detected in the direction of the reference wave is thus equal to:

$$|E_d|^2 = I_R - 2I_R k_0 d|n_2| \sum_{m=1}^{M} J_0(\Delta\phi_m) I_m \sin[\Delta\phi_m \sin(\Omega t)] \quad (1.13)$$

Moreover, $\sin[\Delta\phi_m \sin(\Omega t)] \approx 2 J_1(\Delta\phi_m) \sin(\Omega t)$ i.e.:

$$|E_d|^2 = I_R - 4I_R k_0 d|n_2| \left[ \sum_{m=1}^{M} J_0(\Delta\phi_m) J_1(\Delta\phi_m) I_m \right] \sin(\Omega t) \quad (1.14)$$

For weak phase modulations, that is to say $\Delta\phi_m \ll 1$, the above expression can be reduced to:

$$|E_d|^2 = I_R - 2I_R k_0 d|n_2| \left[ \sum_{m=1}^{M} \Delta\phi_m I_m \right] \sin(\Omega t) \quad (1.15)$$

If moreover, it is considered that each mode transports the same intensity $I_0$, equation (1.15) becomes:

$$|E_d|^2 = I_R - 2I_R k_0 d|n_2| I_0 \left[ \sum_{m=1}^{M} \Delta\phi_m \right] \sin(\Omega t) \quad (1.16)$$

Consequently, the contribution of each mode can be measured in a coherent manner. The power of the signal detected through the dynamic hologram is proportional to $\sum_{m=1}^{M} \Delta\phi_m$.

The Applicants have also estimated the detection sensitivity:

To do this, they have assumed that the limiting noise of the system is an optical noise. The phase shift associated with a disturbance of the optical fiber is a statistical process.

In the case of a conventional quadrature interferometer, the phase modulation is converted linearly into optical power modulation in the form:

$$P_{SMF}(\Delta\phi) = \alpha \Delta\phi \quad (1.17)$$

The associated variance then takes the form:

$$\sigma_{SMF}(\Delta\phi) = \alpha \sigma_{\Delta\phi} \quad (1.18)$$

In the case of an adaptive interferometer with a multimode fiber, the modulated power may be written in accordance with (1.16):

$$P_{MMF}(\Delta\phi) = \frac{\alpha}{M} \sum_{m=1}^{M} \Delta\phi_m \quad (1.17)$$

The factor 1/M signifies that the intensity is divided spatially over the set of modes.

Consequently, the variance of the signal detected with a fiber having M modes may be written:

$$\sigma_{SMF}(\Delta\phi) = \frac{\alpha}{\sqrt{M}} \sigma_{\Delta\phi} \quad (1.18)$$

It is possible to conclude that the variance of the signal detected with a multimode fiber with respect to that obtained with a single-mode fiber is reduced by a factor $\sqrt{M}$. Consequently, the signal-to-noise ratio (SNR) for a multimode fiber increases with $\sqrt{M}$.

The SNR ratio can be subsequently increased by differential detection, for example with two balanced photodiodes, on the diffracted waves $E_1$ and $E_0$ (illustrated in FIG. 1) thus making it possible to reduce the continuous component of the measured intensity.

Figure 2:
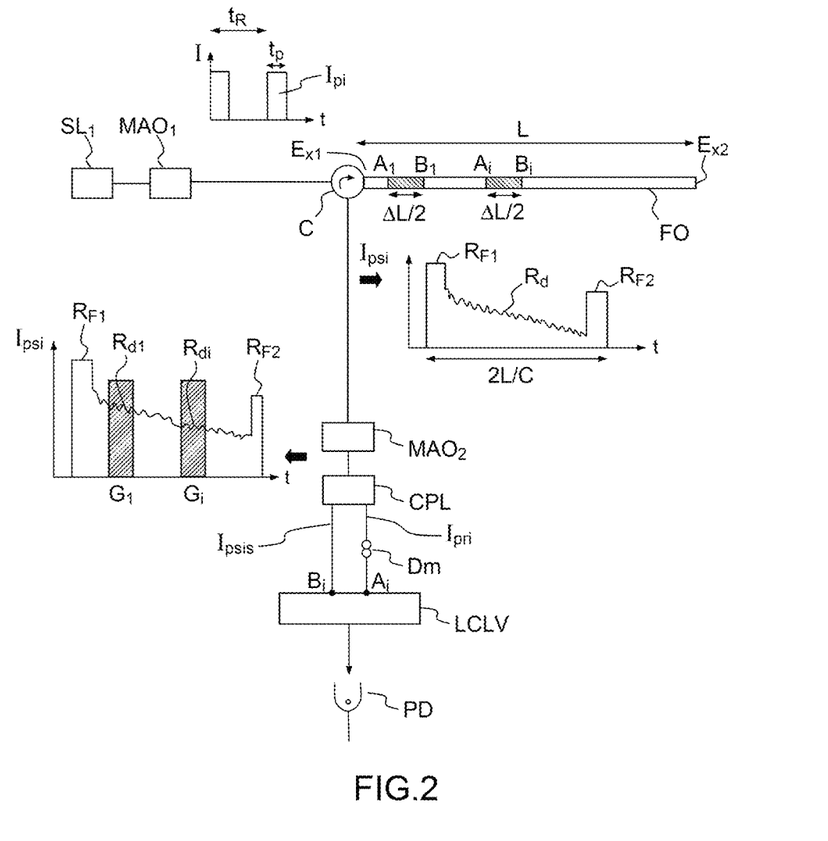
FIG. 2 illustrates a first exemplary embodiment of a distributed fiber sensor according to the invention.

First Exemplary Embodiment of Distributed Optical Fiber Sensor Making it Possible to Locate a Disturbance According to this first exemplary configuration, the distributed optical fiber sensor comprises a laser source $SL_1$, an acousto-optical modulator $MAO_1$ generating optical pulses $I_{pi}$ emitted every $t_R$ and of pulse duration $t_p$, and an optical fiber FO of length L. A series of luminous pulses $I_{pi}$ of duration $t_p$ are thus injected into said optical fiber via a first end $E_{x1}$, propagate along said optical fiber, are reflected at the level of the second end $E_{x2}$, and then backscattered along said fiber, they correspond to the output optical pulses $I_{psi}$ which are utilized and carry information, as is illustrated in FIG. 2. According to this figure, various so-called sensitive zones are probed, and represented between the positions $A_1$ and $B_1$, and then between the positions $A_i$ and $B_i$ at the level of the optical fiber.

Thus, a pulse introduced into the optical fiber FO of length L, via a circulator C gives rise to a back-scattered wave for the entire duration of the return journey of the pulse in the fiber, i.e. for a duration of $2 \times L/c$. FIG. 2 depicts the luminous intensity of an output pulse $I_{psi}$ generated by the backscattering $R_d$, the reflection $R_e$ by the first end and by the reflection $R_s$ by the second end.

A second acousto-optical modulator $MAO_2$ is provided at the circulator C output, as well as a coupler CPL so as to divide the output pulses on two pathways. Means Dm making it possible to introduce a delay of length $\Delta L$ corresponding to the return journey time of the light in the sensitive zone of length $\Delta L/2$ are inserted on one of the two pathways. This delay makes it possible to produce on the LCLV valve an interference between a wave and itself shifted in time.

This temporal shift corresponds to a distance shift of length $\Delta L/2$ in the sensor. The wave which passes down the delayed pathway originates from the position $A_i$ in the fiber, the wave which passes down the undelayed pathway originates from the position $B_i$ in the fiber, which is situated $\Delta L/2$ further on in the sensor.

The interference of the backscatterings originating from the positions $A_i$ and from $B_i$ gives the phase difference between the backscattering coming from $A_i$ and the backscattering coming from $B_i$. The phase involved is indeed that experienced by the wave arising from the position $B_i$ over the length $\Delta L/2$. The bigger the sensitive zone length, the more decorrelated the interference patterns corresponding to the N sensitive zones in the sensor.

The superposition of the N interference patterns does not make it possible to inscribe a grating in the LCLV. Indeed, the relative phase of these interference patterns being random, their superposition decreases the contrast and scrambles the fringes. This is why an acousto-optical modulator $MAO_2$ is inserted before the separation of the backscattering into two pathways, ensured by a coupler CPL. It makes it possible to open a gate of duration $2 \times \Delta L$ so as to allow only the waves originating from one sensitive zone at a time to interfere.

FIG. 2 thus also depicts the interrogation via the opening of two gates $G_1$ and $G_i$ shifted in time and relating to various emission optical pulses $I_{pi}$.

In this case, one of the two pathways serves as reference with reference output optical pulses $I_{pri}$ and the other pathway serves as signal pathway carrying signal optical pulses $I_{psiS}$, all arising from the output optical pulses $I_{psi}$, the optical waves of the two pathways interfering at the level of the LCLV light valve.

This architecture makes it possible to locate along the fiber the phase disturbance induced by the physical quantity to be measured with a spatial resolution $\Delta L/2$. It is measured by frequency analysis of the electrical signal delivered by the photodiode PD.

The maximum rate of interrogation of two different sensitive zones of the sensor is limited by the response time "off" of the liquid crystals: i.e. $t_{off}$, the return time of the liquid crystals in the light valve, thereby implying that the rate of two successive pulses, which is defined by the parameter $t_R$, must be greater than the parameter $t_{off}$.

One ought to wait for the liquid crystals involved in inscribing the interference pattern of the first sensitive zone to be available again.

Second Exemplary Embodiment of Distributed Optical Fiber Sensor Making it Possible to Locate a Disturbance The second exemplary distributed fiber sensor of the invention comprises an architecture the aim of which is to allow the reading of the disturbance on all the sensitive zones of the sensor in a short time. The issue here is to be able to reconstruct a spatial array of virtual sensors (see definition hereinabove) so as to be able to construct for example an acoustic antenna with "electronically" reconfigurable spacing, this presenting a decisive advantage with respect to the solutions with dispersed sensors.

Figure 3A:
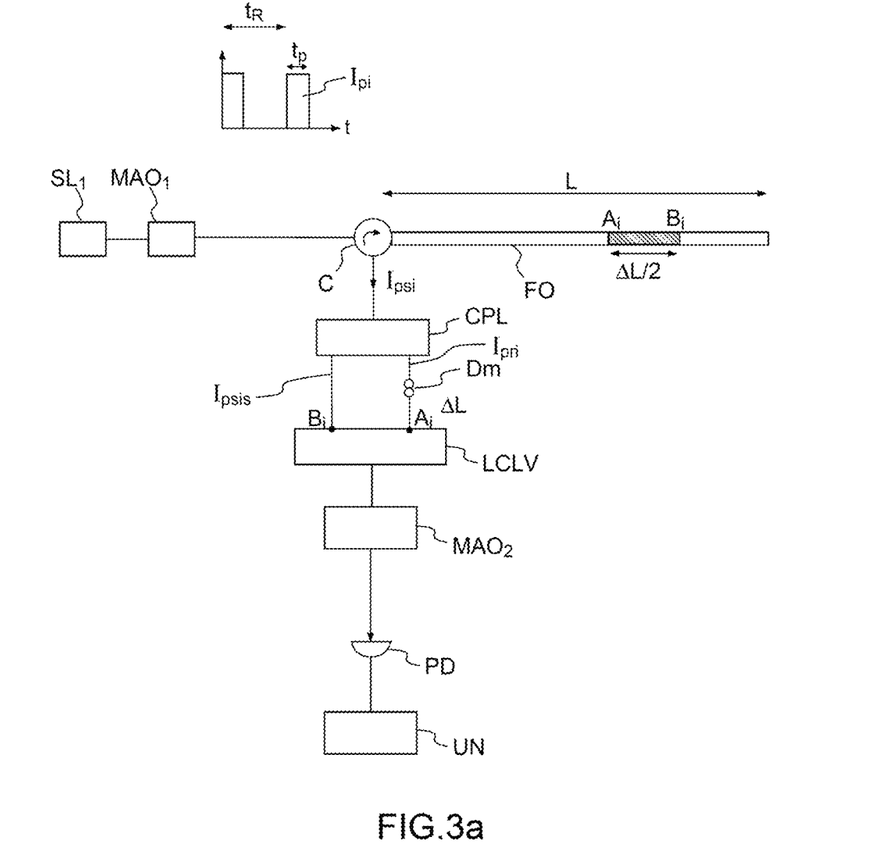
FIGS. 3a and 3b relate to a second exemplary embodiment of a distributed fiber sensor according to the invention.

Accordingly it is necessary for a "mean" grating, called a "static grating", to be inscribed in the LCLV. This grating is obtained by interference of the reflection of an input pulse $I_{pi}$ with itself delayed by $\Delta L$ on the fiber extremity (fiber end) connector. The phase is therefore accumulated along the entire fiber. The slow phase variations along the entire fiber will modify the interference pattern making it possible to inscribe this mean grating. It is then possible to use this mean grating as diffraction grating for another light wave. This third-party wave is the backscattering of the pulse in the fiber.

A luminous pulse of duration $t_p$ is therefore injected into the fiber and is back-scattered in the latter. It is also reflected at the end of the fiber. It is obtained for example by a laser source $SL_1$ followed by an acousto-optical modulator $MAO_1$. This pulse gives rise to a back-scattered wave for the entire duration of the return journey of the pulse in the fiber, i.e. for $2 \times L/c$. The back-scattered and reflected signal is separated into two pathways, via a circulator C and by virtue of a coupler CPL.

Figure 3B:
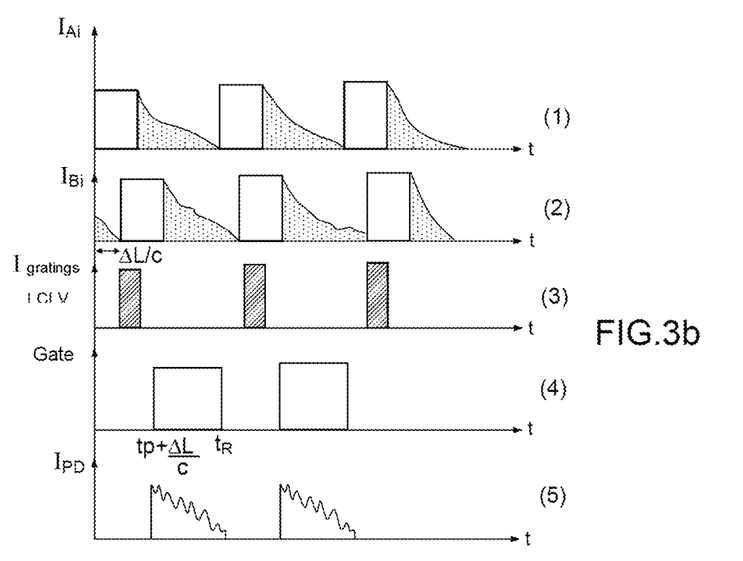

As in the first exemplary sensor, a delay of length $\Delta L$ corresponding to the return journey time of the light in the sensitive zone of length $\Delta L/2$ is inserted into one of the two pathways by means Dm. This delay makes it possible to produce on the LCLV an interference between a wave and itself shifted in time. This temporal shift corresponds to a distance shift of length $\Delta L/2$ in the sensor. This temporal shift fixes the minimum duration of the input pulse $t_p > \Delta L/c$. This configuration is illustrated in FIGS. 3a and 3b.

Every $t_r$, a new pulse is dispatched so that the mean grating does not wane with $t_r > 2 \times L/c$ and $t_r < t_{off}$ where $t_{off}$ is the return time for the liquid crystals to regain their initial state.

The maximum length of the sensor is therefore related to $t_{off}$ by:

$$L_{max} < c \times t_{off}/2.$$

A photodiode PD is placed on a diffraction order. The diffraction of the back-scattered wave on the mean grating is detected on the photodiode for the entire duration of the backscattering. So as not to saturate the detector, an acousto-optical modulator $MAO_2$ is placed before the photodiode and makes it possible to cut$_{off}$ the waves reflected by the ends of the fiber corresponding to the input and output connectors of the fiber. In contradistinction to the aforementioned first exemplary distributed fiber sensor, the electrical signal delivered by the photodiode contains the information regarding phase shift over the entire length of the sensitive fiber with a resolution $\Delta L/2$ at a given instant.

It is the pulse repetition frequency analyzed by a processing unit UN which allows the frequency analysis of the signal with as limit condition on the sampling $f_{ac} < f_{rep}/2$, $f_{ac}$ being the highest disturbance signal frequency that it is desired to detect in accordance with the Nyquist-Shannon sampling theorem which indicates that when sampling at the frequency Fe, only the frequencies below Fe/2 can be transmitted without information loss.

FIG. 3b portrays the temporal superposition of an output intensity $I_{psi}$ arising from the position $A_i$, that arising from the position $B_i$ in the fiber, which are denoted $I_{Ai}$ and $I_{Bi}$, the inscribing of the static grating, the generation of temporal analysis gates and the backscattered intensity analyzed and which are illustrated more precisely by:
  (1): the curve $I_{Ai}(t)$
  (2): the curve $I_{Bi}(t)$
  (3): the curve $I_{grating\ LCLV}$
  (4): the curve Gate(t), making it possible to filter the reflections of the ends of the fiber
  (5): the curve $I_{PD}(t)$, intensity relating to the backscattering by virtue of the use of a temporal gate at the level of the component $MAO_2$.

Third exemplary embodiment of distributed optical fiber sensor making it possible to locate a disturbance based on a Brillouin dynamic grating:

This exemplary embodiment comprises a distributed architecture based on a dynamic Brillouin grating as movable reflector and an optical interrogation wave comprising a series of optical pulses.

The Brillouin grating, generated by the interaction between two optical pulses, makes it possible to define a sensitive optical fiber portion. In this case, one is not concerned with the frequency aspect of the stimulated Brillouin interaction but solely with the reflection coefficient of the dynamic grating. A probe wave then makes it possible to probe the optical fiber.

Figure 4A:
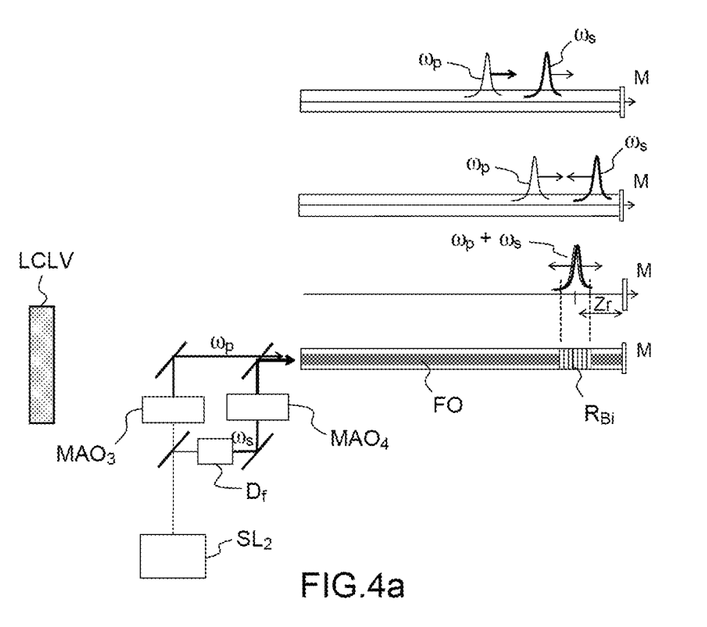
FIGS. 4a to 4c relate to a third exemplary embodiment of a distributed fiber sensor according to the invention.
Figure 4B:
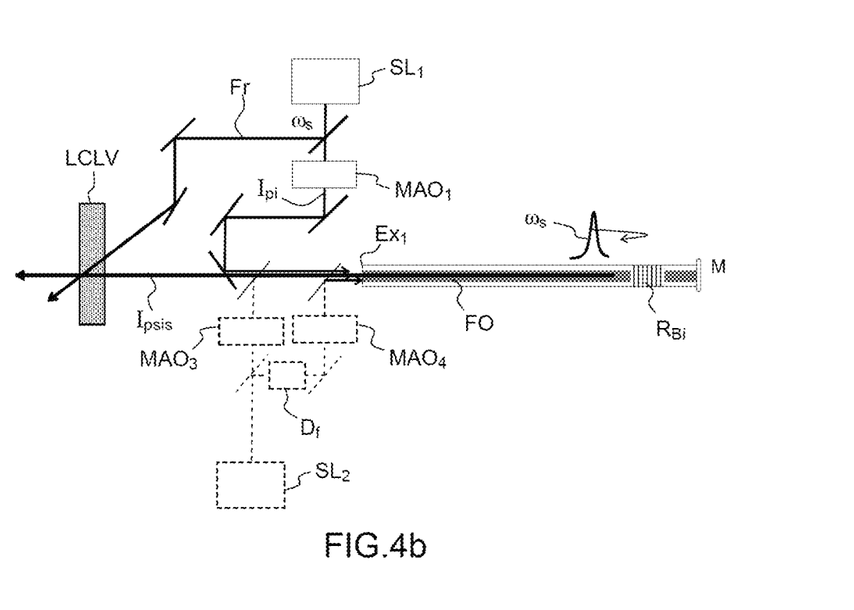

The proposed architecture is shown diagrammatically in FIGS. 4a and 4b.

FIG. 4a illustrates the part of the means that are necessary for the step of writing the Brillouin grating $R_{Bi}$. Two pulses arising from one and the same laser $SL_2$ of optical frequency $\omega_p$ but which are shifted temporally and spectrally inscribe a Bragg grating by Stimulated Brillouin Scattering $R_{Bi}$. Thus on the basis of a single laser source $SL_2$, there are provided after division of the laser beam, two acousto-optical modulators $MAG_3$ and $MAO_4$ and means of frequency shifting Df, which may be electro-optical, so as to generate two series of optical pulses at the optical frequencies $\omega_p$ and $\omega_s$ (the wave at the frequency $\omega_p$ is represented by a thin line, the wave at the frequency $\omega_s$ being represented by a thick line). Typically, the maximum length of the optical fiber L is limited to half the coherence length $L_{coh}$ of the laser used.

The Stokes wave is shifted toward the low frequencies of $\omega_B$, the Brillouin frequency, corresponding to the Doppler effect: reflection of the pump on a movable grating. This grating, equivalent to a Bragg grating (due to the electrostriction effect between the pump wave and the Stokes wave in silica), propagates in the same direction as the pump at the speed of sound $c_{ac}$ in the fiber $\omega_B=2nc_{ac}/\lambda$.

The duration of the pulses determines the length of the grating. The grating is successively inscribed at various positions $Z_r$ in the fiber.

Its position is controlled (that is to say the zone in the fiber where the reflection of the pulse at $\omega s$ crosses the pulse at $\omega p$) by the time interval $\Delta t$ between the two pulses. In practice, it is proposed to use a reflecting treatment M at the end of the fiber so as to obtain the reflection of the wave at $\omega s$ making it possible to stimulate the Brillouin scattering.

Thus, on the first pathway, the first acousto-optical modulator $MOA_3$ is used to obtain the pump pulses. On the second pathway, the frequency of the laser is shifted by a value corresponding to $w_B(\omega_s=\omega_p-\omega_s)$ i.e. about 10 GHz in the optical fibers, and then another acousto-optical modulator $MAO_4$ is used to obtain the Stokes pulses.

FIG. 4b illustrates the part of the means that are necessary for the step of reading the phase which consists in using this Brillouin grating $R_{Bi}$ as a Bragg mirror.

A third "probe" wave arising from the optical assembly comprising the laser $SL_1$ is injected into the fiber at a frequency $\omega_s$ and makes a return journey between the input of the fiber and the Brillouin grating $R_{Bi}$. It accumulates a phase shift on this return journey.

This phase shift is the signal of interest. A hologram is caused on the LCLV valve between the return from the probe and a reference originating from the same laser. An optical assembly is used comprising a laser $SL_1$ which emits a laser beam, divided so as to generate a laser beam $F_r$, the other part of said beam being introduced into an acousto-optical modulator to generate a series of pulses $I_{pi}$ at the optical frequency $\omega_s$ so as to carry out the reading step. Typically, the lifetime of the grating thus inscribed is defined by the lifetime of the acoustic phonons in the material of the optical fiber which may be in a conventional manner, silica, i.e. about 10 ns. It is therefore necessary to read the phase in the 10 ns following writing. The pulses $I_{pi}$ introduced into the optical fiber generate, at fiber output, pulses $I_{psiS}$ after reflection at the level of the Brillouin grating $R_{Bi}$, interfering with the reference beam on the LCLV light valve.

Figure 4C:
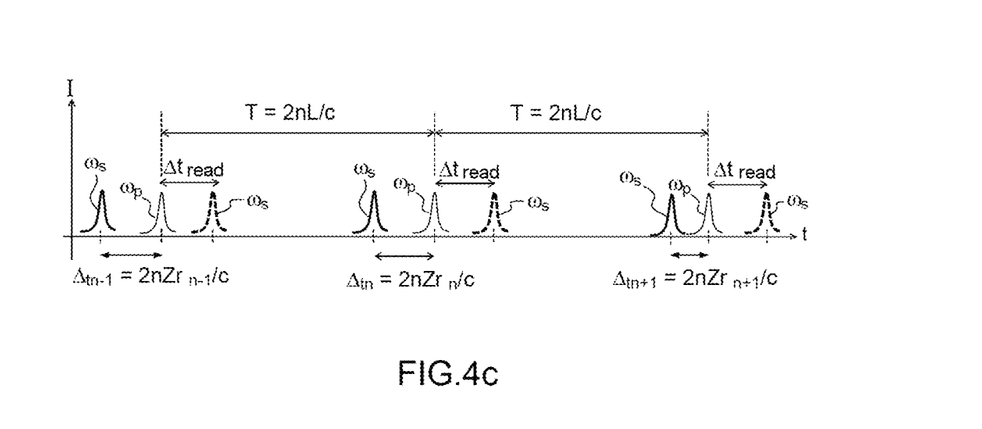

FIG. 4c illustrates the alternation of writing steps and of reading steps, corresponding to variations of inscription of Brillouin gratings $R_{Bi}$ at various sites in the optical fiber. The position of the Brillouin grating $R_{Bi}$ in the fiber is adjusted through the temporal shift between two writing pulses at the frequencies $\omega_p$ and $\omega_s$.

At each writing-reading cycle, the spectrum obtained at cycle N is subtracted from the spectrum obtained at cycle N+1 so as to have access to the information which occurs in the fiber portion corresponding to the interrogation (writing/reading) by the pulses of cycle N.

The period of the writing-reading process is: $T=2L/c=1/f_{rep}$

One obtains the spectrum Si (t, $L-Z_r$) of the phase disturbance signal at ti=i*T, for the Brillouin reflector $R_{Bi}$ at the position $L-Z_{ri}$. More precisely, Si(t, $L-Z_r$) is the spectrum of the acoustic signal which modulates the phase on a return journey between the input of the fiber and the Brillouin reflector $R_{Bi}$ inscribed, therefore over the length $2\times L-Z_{ri}$.

The invention claimed is:

1. A distributed optical fiber sensor of dynamic stress state, said sensor comprising:
   an optical assembly comprising:
   at least one laser ($SL_1$) emitting at a wavelength $\lambda$, said optical assembly being configured to generate a series of optical pulses ($I_{pi}$);
   an optical fiber (FO) exhibiting a first end ($E_{x1}$) and a second end ($E_{x2}$) and of optical length L;
   an optical system configured to:
   Inject, via a circulator, through said first end ($E_{x1}$) at least said series of optical pulses ($I_{pi}$);
   receive at the level of said end ($E_{x1}$) at least one series of output optical pulses, an output optical pulse ($I_{psi}$) being a carrier of the intensity of reflection of said ends of the fiber and of the backscattered intensity along said fiber;
   create, by a coupler, two optical pathways carrying output optical pulses;
   delay, by means for delaying, said output optical pulses on one of said pathways, to create a signal pathway carrying signal optical pulses and a reference pathway carrying reference optical pulses ($I_{pri}$), said delaying means introducing an additional length to be traversed $\Delta L$, with $\Delta L/2$ the length of a sensitive zone defined between a position $A_i$ and a position $B_i$ at the level of said fiber and referenced from said first end; and
   produce a series of interference zones corresponding to the interference between said reference pulse ($I_{pri}$) and a signal optical pulse ($I_{psiS}$) arising from an output optical pulse ($I_{psi}$);
   a second acousto-optical modulator ($MAO_2$) making it possible to select gates of a duration equal to $2\Delta T/c$ with c the speed of light in vacuum, so as to allow only backscattered waves originating from a sensitive zone of said fiber at one and the same time to interfere, the pulses being separated by a duration $t_R$, such that $t_R>2L/c$, the duration of said pulses $t_p$ being $t_p>\Delta L/c$ and $t_R>t_{off}$ with $t_{off}$ the response time of the liquid crystals; and a holographic detector (HD) comprising:
- a liquid-crystal light valve (LCLV) comprising a liquid crystal layer disposed between two substrates, one of the substrates comprising a photoconductor material for said emission wavelength ($\lambda$), said valve (LCLV) being disposed so that it at least partially covers said interference zones, said valve being configured to produce holograms on the basis of said interference zones;
- at least one optical detector (PD) configured to detect output optical signals diffracted by said holograms; and
- a digital processing unit situated at the optical detector output to analyze the various probed active zones.

2. The distributed optical fiber sensor of claim 1, wherein the optical assembly comprising at least one laser emitting at a wavelength $\lambda$ comprises a first acousto-optical modulator ($MAO_1$) for generating optical pulses.

3. The distributed optical fiber sensor of claim 1, wherein said fiber is single-mode.

4. The distributed optical fiber sensor of claim 1, wherein said fiber is multimode.

5. The distributed optical fiber sensor of claim 1, wherein the emission wavelength of the optical assembly is equal to 1.5 μm.

6. A distributed optical fiber sensor of dynamic stress state, said sensor comprising:
an optical assembly comprising:
- at least one laser ($SL_1$) emitting at a wavelength k, said optical assembly being configured to generate a series of optical pulses ($I_{pi}$);
- an optical fiber (FO) exhibiting a first end ($E_{x1}$) and a second end ($E_{x2}$) and of optical length L;
an optical system configured to:
- inject, via a circulator, through said first end ($E_{x1}$) at least said series of optical pulses ($I_{pi}$);
- receive at the level of said end ($E_{x1}$) at least one series of output optical pulses, an output optical pulse ($I_{psi}$) being a carrier of the intensity of reflection of said ends of the fiber and of the backscattered intensity along said fiber;
- create, by a coupler, two optical pathways carrying output optical pulses;
- delay, by means for delaying, said output optical pulses on one of said pathways, to create a signal pathway carrying signal optical pulses and a reference pathway carrying reference optical pulses ($I_{pri}$), said delaying means introducing an additional length to be traversed $\Delta L$, with $\Delta L/2$ the length of a sensitive zone defined between a position $A_i$ and a position $B_i$ at the level of said fiber and referenced from said first end; and
- produce a series of interference zones corresponding to the interference between said reference pulse ($I_{pri}$) and a signal optical pulse ($I_{psiS}$) arising from an output optical pulse ($I_{psi}$);
a second acousto-optical modulator ($MAO_2$) making it possible to select gates of a duration equal to $t_R-(t_p+\Delta T/c)$, with c the speed of light in vacuum, said gates making it possible to filter the intensities of reflection of said ends of the fiber and to preserve a part of the backscattered intensity along said fiber, the pulses being separated by a duration $t_R$, such that $t_R>2L/c$, the duration of said pulses $t_p$ being $t_p>\Delta T/c$ and $t_R<t_{off}$ with $t_{off}$, the response time of the liquid crystals; said gates making it possible to filter the intensities of reflection of said ends of the fiber and to preserve a part of the backscattered intensity along said fiber; and
a holographic detector (HD) comprising:
- a liquid-crystal light valve (LCLV) comprising a liquid crystal layer disposed between two substrates, one of the substrates comprising a photoconductor material for said emission wavelength ($\lambda$), said valve (LCLV) being disposed so that it at least partially covers said interference zones, said valve being configured to produce holograms on the basis of said interference zones;
- at least one optical detector (PD) configured to detect output optical signals diffracted by said holograms; and
- a digital processing unit situated at the optical detector output to analyze the various probed active zones.

7. The distributed optical fiber sensor of claim 6, wherein the optical assembly comprising at least one laser emitting at a wavelength $\lambda$ comprises a first acousto-optical modulator ($MAO_1$) for generating optical pulses.

8. The distributed optical fiber sensor of claim 6, wherein said fiber is single-mode.

9. The distributed optical fiber sensor of claim 6, wherein said fiber is multimode.

10. The distributed optical fiber sensor of claim 6, wherein the emission wavelength of the optical assembly is equal to 1.5 μm.

* * * * *

UNITED STATES PATENT AND TRADEMARK OFFICE
CERTIFICATE OF CORRECTION

PATENT NO. : 11,175,193 B2
APPLICATION NO. : 15/560474
DATED : November 16, 2021
INVENTOR(S) : Stéphanie Molin et al.

Page 1 of 1

It is certified that error appears in the above-identified patent and that said Letters Patent is hereby corrected as shown below:

In the Claims

Claim 1, Column 14, Line 60, "to select gates of a duration equal to $2\Delta T/c$" should read -- to select gates of a duration equal to $2\Delta L/c$ --.

Claim 6, Column 16, Line 11, "to select gates of a duration equal to $t_R - (t_p+\Delta T/c)$," should read -- to select gates of a duration equal to $t_R - (t_p+\Delta L/c)$, --.

Claim 6, Column 16, Line 17, "the duration of said pulses $t_p$ being $t_p > \Delta T/c$" should read -- the duration of said pulses $t_p$ being $t_p > \Delta L/c$ --.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*